May 7, 1946.　　　O. P. WARNER　　　2,399,842
SEPARATOR
Filed Dec. 18, 1940　　　4 Sheets-Sheet 1
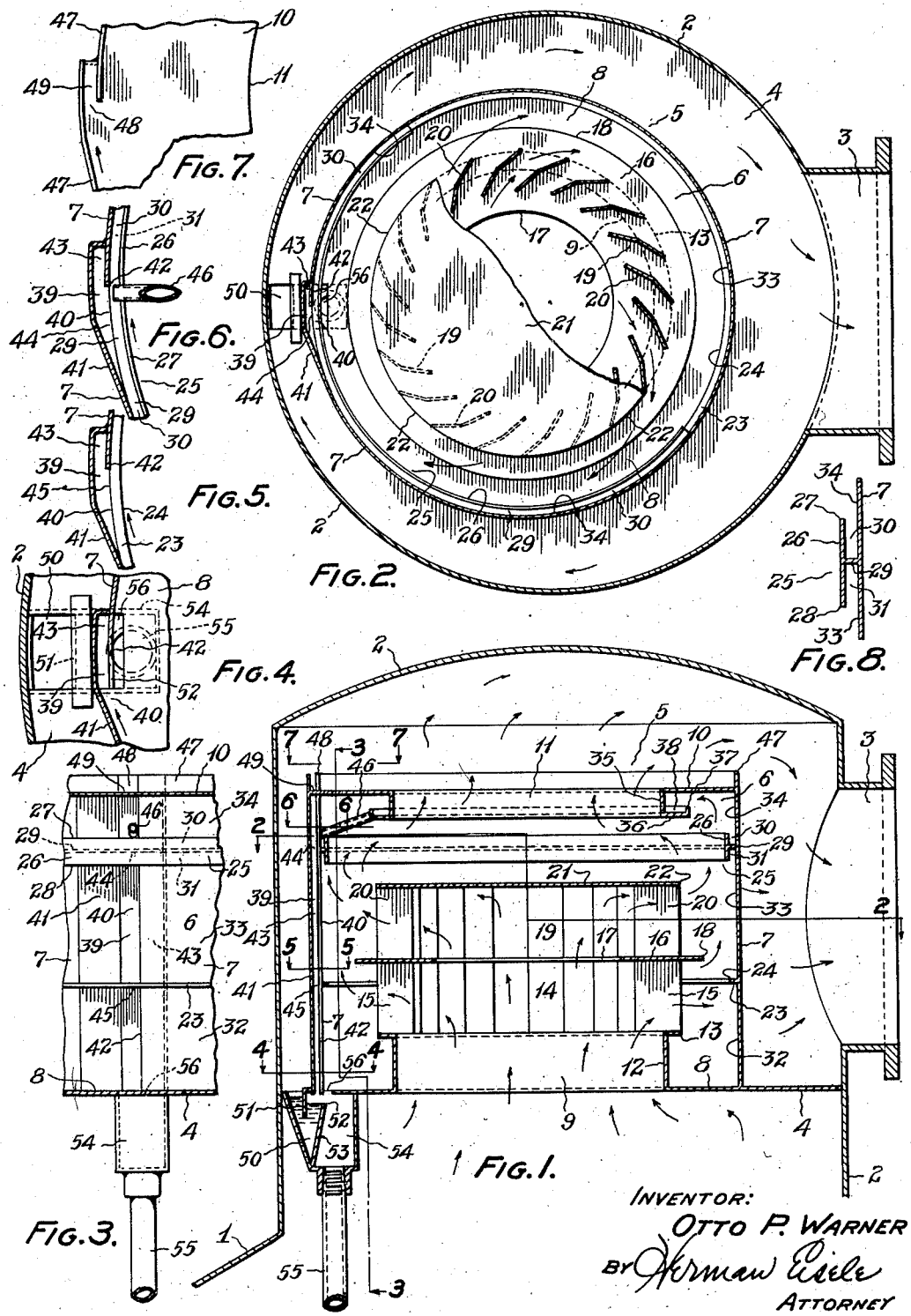
INVENTOR:
OTTO P. WARNER
BY Herman Eisele
ATTORNEY

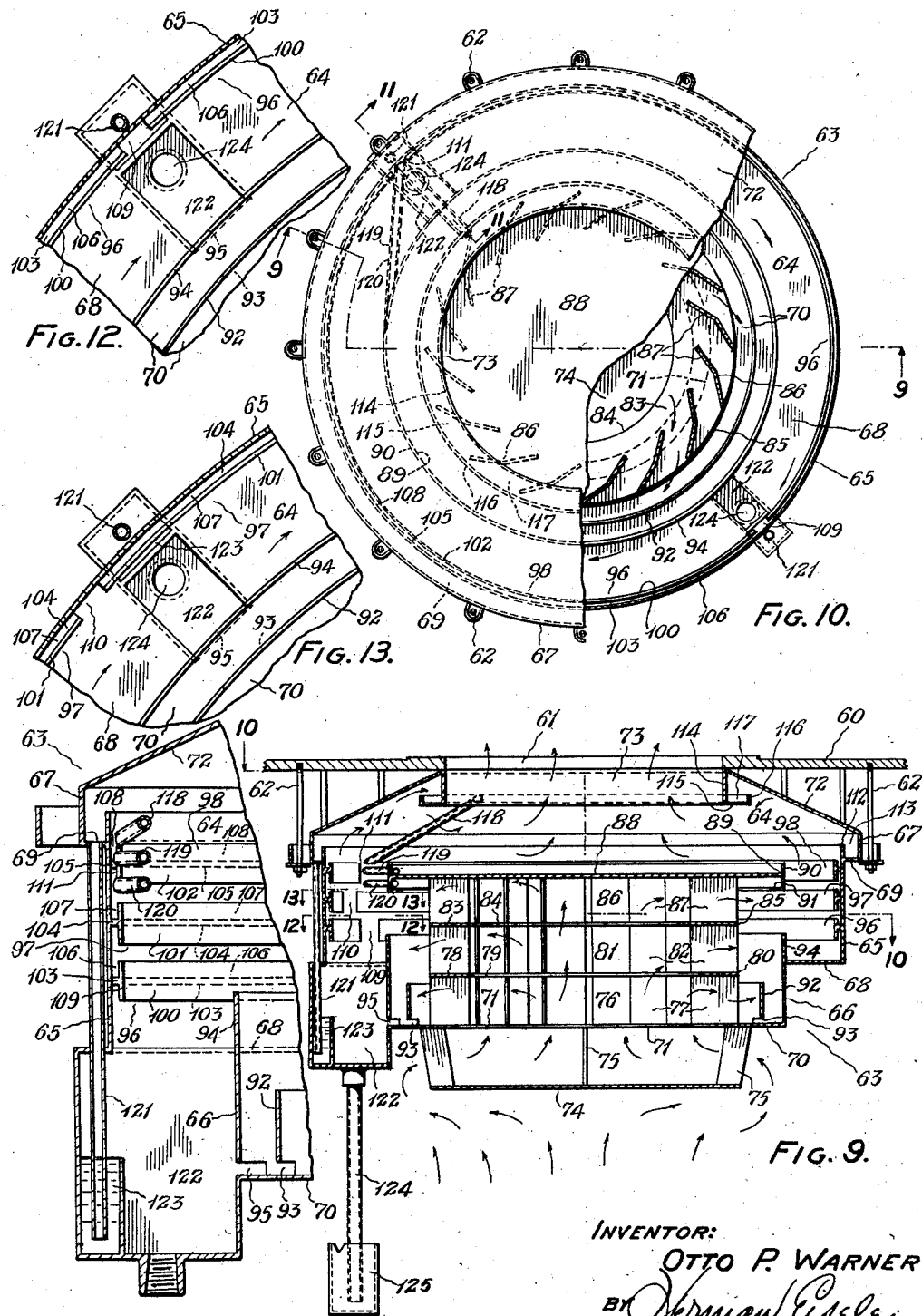

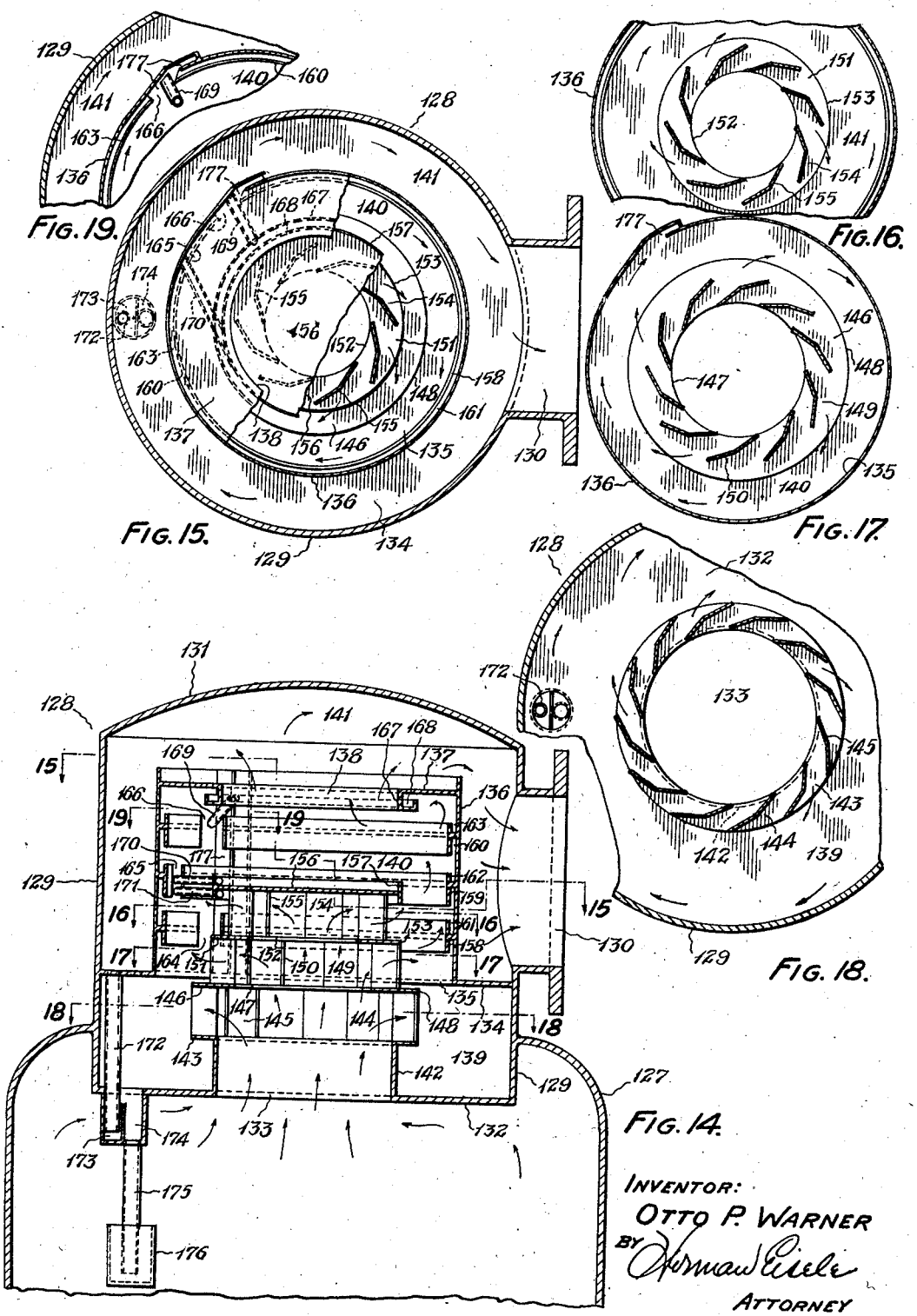

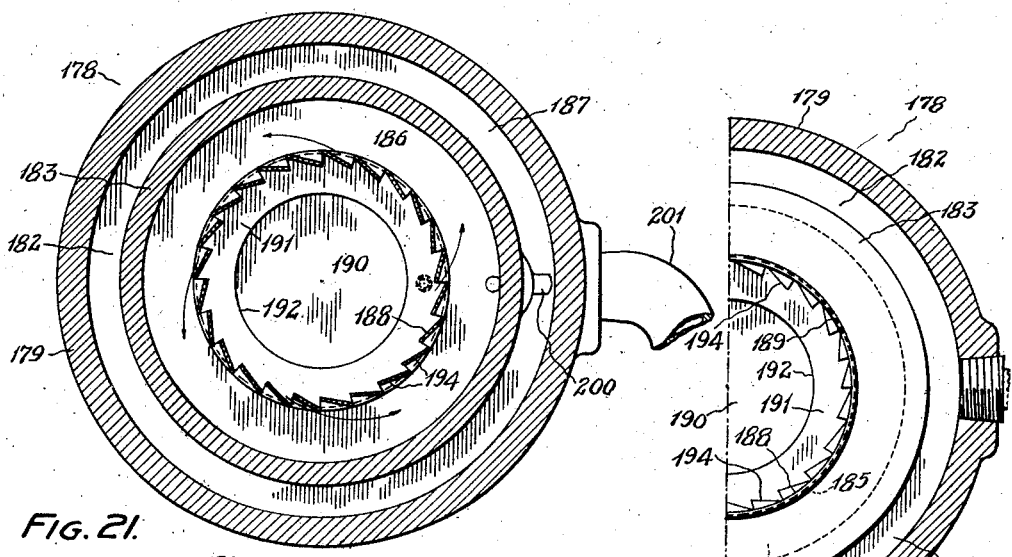
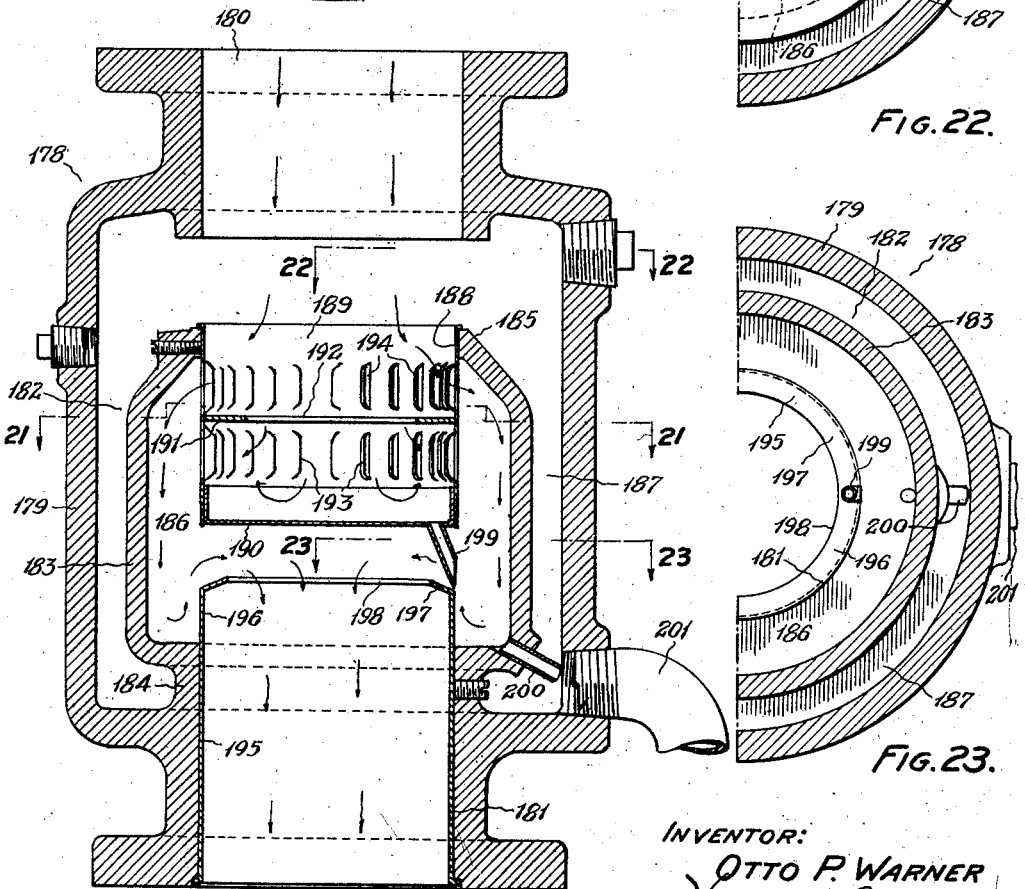

Patented May 7, 1946

2,399,842

UNITED STATES PATENT OFFICE 2,399,842

SEPARATOR

Otto P. Warner, Lakewood, Ohio

Application December 18, 1940, Serial No. 370,616

14 Claims. (Cl. 183—91)

This invention relates to devices known as separators and particularly to separators of the type which are adapted for use in clarifying gases, such as air, vapors, steam or mixtures thereof and separating from such gases, the liquids, semi-liquids, heavier gases or similar substances carried by or intermingled with or associated with the gases.

Separators of this type are extensively used in industry for clarifying gases and such clarified gases are either discharged to the atmosphere or transferred to other apparatus where the energy of the gases is utilized or where the gases are subjected to further treatment or processing. The liquid and other substances are separated from the gases not only because their presence would be objectionable if discharged to the atmosphere or if transferred to other apparatus, but also because, in many instances, it is desired to recover such separated substances for subsequent processing and manufacture. The separated liquid substances in devices of this class are accordingly either returned to the evaporator or transferred to other apparatus or discharged to a waste drain.

More particularly this invention relates to separators used for the above purposes which are of the non-rotating relatively stationary type and which provide for the treatment of gases in motion without utilizing any mechanically moving parts and in which the moving gases are caused to rotate rapidly. In separators of this type the heavier entrained substances are projected against portions of the enclosing wall of the separator, by means of a whirl promoting tuyère. The expelled substances are collected from the wall portions of the separator and drained off thru an automatic trap or returned to the source of the gases to be re-evaporated.

As is well known, separators of this type are associated with boilers, evaporators, receivers, pipe lines, and the like for the purpose of treating and clarifying the gases and/or vapors generated in or passing thru such vessels or conduits.

As is further well known, separators of this type are also incorporated in boilers and evaporators where they serve to increase the capacity of the boilers or evaporators due to their clarifying action on the vapor generated in the evaporating vessel especially when such evaporation occurs at a high rate.

Previously known separators of this type, insofar as I am aware, have embodied certain defects which seriously interfered with their efficiency of operation and it is accordingly a general object of this invention to produce a separator of this type which will perfect the performance of the process of gas or vapor clarification by effectively and efficiently removing entrained liquids or heavier substances from these gases.

It is a further and prime object of this invention to effectively remove such liquids or fluids with a minimum of resistance to the flow of the gas or vapor which is being clarified or treated and without any objectionable reduction in the pressure or velocity of the gases and to do this efficiently throughout a wide range of gas velocities.

It is a further general object of this invention to provide a separator which is simple, durable, dependable and economical in construction and which occupies a minimum of space for a relatively large separating capacity.

It is a further and more specific object of this invention to provide an improved whirl promoting tuyère construction for a separator in which the liquid laden gases are divided into a plurality of adjacent whirling layers of gases whereby the short circuiting of gases thru the separator is prevented and whereby the clarification of the several layers is more effectively accomplished.

It is a further object of this invention to provide means for separately treating the gases in each whirling layer and to separately collect the liquids expelled from each of the whirling layers.

It is a further object of this invention to embody a means for quickly removing the separated liquids to a position out of contact with the travelling gases and to shield them from the clarified gases in order to prevent the re-entraining of the separated liquid with the clarified gases.

It is a further and more specific object of this invention to provide a separator construction which will prevent the objectionable continuous creepage of separated liquids along the outer walls of the separator both in a longitudinal and a peripheral direction.

It is a further and more specific object of this invention to provide improved peripheral panels or bands associated with and forming liquid conducting races with the inner face of the shell of the separator and disposed within the path of the whirling gases, adapted to efficiently collect and conduct the separated liquid from the separator.

It is a further specific object of this invention to produce an improved form of duct associated with the shell of the separator for collecting expelled liquid.

Further and more specific objects of this invention will become apparent from the following description and claims.

Referring to the drawings:

Fig. 1 is a vertical axial section illustrating one form of this improved separator, this separator being shown installed in the upper end of an evaporator which, being well known in the art, is only fragmentarily illustrated.

Fig. 2 is a transverse section of the structure shown in Fig. 1, taken on the broken plane indicated by the lines 2, 2 in Fig. 1.

Fig. 3 is a fragmentary vertical axial section illustrating a certain drain duct construction associated with the separator, this view being taken on the plane indicated by line 3, 3 in Fig. 1.

Fig. 4 is an enlarged transverse sectional view taken on the plane indicated by line 4, 4 in Fig. 1, and illustrating the well for receiving the separated liquid.

Fig. 5 is a similarly enlarged transverse sectional view taken on the plane indicated by line 5, 5 in Fig. 1.

Fig. 6 is a similarly enlarged transverse sectional view taken in the plane indicated by line 6, 6 in Fig. 1.

Fig. 7 is a fragmentary plan view taken on the plane indicated by line 7, 7 in Fig. 1.

Fig. 8 is an enlarged view of a portion of the wall structure of Fig. 1 shown to more clearly disclose the details of construction.

Fig. 9 is a vertical axial section similar to Fig. 1, illustrating a modified form of this improved separator, also, as in the previously described form, mounted in the upper portion of an evaporator.

Fig. 10 is a transverse sectional view thru the separator, illustrated in Fig. 9, this view being taken on the broken plane indicated by line 10, 10 in Fig. 9.

Fig. 11 is an enlarged sectional view, more clearly disclosing certain details of the separator wall structure, this view being taken on the plane indicated by line 11, 11 in Fig. 10.

Fig. 12 is a transverse sectional view showing certain details of construction, this view being taken on the plane indicated by line 12, 12 in Fig. 9.

Fig. 13 is a similarly enlarged transverse sectional view taken on the plane indicated by line 13, 13 in Fig. 9.

Fig. 14 is another vertical axial section similar to Fig. 1 illustrating a second modified form of this improved separator, also, as in the previously described forms, adapted to be mounted in the upper part of an evaporator.

Fig. 15 is a transverse sectional view thru the separator illustrated in Fig. 14, this view being taken on the broken plane indicated by the line 15, 15 in Fig. 14.

Fig. 16 is a fragmentary plan sectional view thru the separator on a plane, level with the upper portion of the tuyère construction, this view being taken on the plane indicated by the line 16, 16 in Fig. 14.

Fig. 17 is another fragmentary plan sectional view thru the separator, on a plane, level with the intermediate portion of the tuyère construction, this view being taken on the plane indicated by line 17, 17 in Fig. 14.

Fig. 18 is a sectional view thru the separator and evaporator on a plane, level with the lower portion of the tuyère construction, this view being taken on the plane indicated in Fig. 14, by line 18, 18.

Fig. 19 is a fragmentary sectional view taken on the plane indicated by line 19, 19 in Fig. 14.

Fig. 20 is a vertical axial section thru another modified embodiment of this invention illustrating the invention in a somewhat simplified form applied to a line type of separator in which the gases travel in a downward direction.

Fig. 21 is a transverse section thru the separator illustrated in Fig. 20, this view being taken on the plane indicated by line 21, 21 in Fig. 20.

Fig. 22 is a fragmentary section thru the separator illustrated in Fig. 20, this view being taken on the plane indicated by line 22, 22 in Fig. 20.

Fig. 23 is another fragmentary section thru the separator illustrated in Fig. 20, this view being taken on the plane indicated by line 23, 23 in Fig. 20.

As indicated above, this improved separator is adapted to clarify or treat gases, vapors, and mixtures thereof as well as mixtures of gases and/or vapors with liquids, semi solid and solid substances. In the following specifications and claims, the term "gas" or "gases" is used for the sake of brevity of description, to designate any gaseous substances capable of being treated in the hereinafter described separators.

Similarly, the substances which this improved separator is adapted to remove from the gases include moisture, liquids, semi liquids, solids, and substances suspended in or dissolved in or mixed with liquids, all of the same or different nature or composition than the gases. In the following specifications and claims the term "liquid" is used for the sake of brevity of description, to indicate any of the substances capable of being separated from the gases in this improved device and the term "clarified gases" is used to indicate gases from which the liquid has been removed and the term "liquid laden gases" is used to indicate the gases entering and about to be treated in the separator.

In the following specification and claims, also, the term "axis" is intended to indicate the longitudinal center line of the separator about which the side wall or walls of the separator are circumscribed. The term "inner" is intended to indicate a direction toward or a position facing toward the axis or toward a point interiorly of the circumscribing shell structure of the separator. The term "outer" is intended to indicate a direction away from the axis or exteriorly of the chamber in which the separating apparatus is enclosed. The term "longitudinal" in these specifications, further, is intended to indicate a direction parallel to the axis and the term "transverse" is intended to indicate a direction at right angles to the axis, and the term "radial" is intended to indicate a direction toward or from the axis.

The first form of this invention to be described is illustrated in Figures 1 to 8 inclusive, and is mounted with its axis in a vertical position and is adapted to clarify gases passing thru the separator in an upwardly direction. This form of this invention is shown in a use in which the separator is mounted within an evaporator. In this evaporator the vapor or gas is assumed to be released from the surface of the liquid, not shown, carrying with it globules of liquid. The gas, advanced by a difference in pressure, is passed thru the separator where the entrained liquid is separated, the clarified gas being passed outwardly thru an opening in the evaporator adjacent the outlet opening in the separator and the separated liquid being returned to the bath of liquid in the evaporator.

Referring now to Figures 1 to 8, 1 indicates an evaporator shell, only a portion of which is shown. The vapor or gas which rises from the surface of the liquid is assumed to be evaporated in this shell and is indicated by arrows in Fig. 1. The form of the evaporator and the means for evaporating the liquid may be of any desired type and, as apparatus of this type is well known, need not be here shown or described. The upper portion or dome of the evaporator shell is indicated at 2 and is formed with a laterally directed outlet 3. Extending transversely of the shell at a point below the outlet 3 is a wall 4 cutting off direct communication between the evaporating liquid and the outlet.

Supported upon the wall 4 is a separator indicated generally at 5 and consisting of a chamber 6 surrounded and enclosed by a cylindrical wall or shell 7. The chamber 6 is further formed with a head 8 at the lower end, as the separator is illustrated in Fig. 1, this head being, in the embodiment shown, a continuation of the transverse wall 4. The head 8 is formed with an opening 9 substantially coaxial with the cylindrical shell of the separator 5, this opening constituting an inlet opening to the separator. The chamber 6 is likewise formed with a head 10 at the upper end as shown in Fig. 1, the head 10 being formed with an opening 11 which constitutes an outlet opening for the separator.

Adjacent the inlet opening 9 and interiorly of the separator 5 is a sleeve 12 connected at its lower end to the head 8 and formed at its upper or inner end with an outwardly extending transverse flange 13. Supported upon this flange 13 is a whirl promoting tuyère of the cylindrical or barrel type indicated generally at 14. This tuyère is of the multi-vane type and consists of a plurality of axially alined vanes peripherally spaced from each other and inclined to a radial plane passing thru the axis, these vanes being indicated at 15. Mounted upon the upper end of the tuyère 14 is a transversely positioned partition illustrated as a flat plate 16 formed with an aperture 17 and an outer periphery 18.

Mounted upon the partition plate 16 is a second whirl promoting tuyère of the cylindrical or barrel type indicated generally at 19. This tuyère is likewise of the multi-vane type and consists of a plurality of axially alined vanes peripherally spaced from each other and inclined to a radial plane passing thru the axis, these vanes being indicated at 20. Mounted upon the upper end of the tuyère 19 is a transversely disposed baffle illustrated as a blank plate indicated at 21 and formed with an outer periphery 22. As shown on the drawings, the partition plate 16 and the baffle 21 are preferably coaxially positioned with reference to the inlet opening 9 and the shell 7.

As will appear, the diameter of the aperture 17 in the partition 16 is smaller than the diameter of the inlet opening 9; the area of the aperture 17 is, in fact, substantially one half, in the embodiment illustrated, of the area of the opening 9. As will also appear, the outer periphery 18 of the partition 16 overlaps the inlet opening 9 and is spaced from the shell 7, an annular opening being formed between the periphery 18 and the shell 7. It will also appear that the outer periphery 22 of the baffle 21 overlaps the aperture 17 in the partition 16 and is likewise spaced from the shell 7, an annular opening being formed between the periphery 22 and the shell 7.

Reference to the drawing further discloses that the area of the annular opening between the periphery 22 and the shell 7 is greater than the area of the annular opening between the periphery 18 and the shell 7, the annular area around the baffle 21 being in fact substantially twice the area around the partition 16, in the embodiment illustrated. It will also be evident that the partition 16, in the embodiment shown, is located substantially midway between the flange 13 and the baffle 21.

Mounted upon and projecting inwardly from the inner surface of the wall or shell 7 is an annularly formed flange or lip 23, this lip is positioned longitudinally intermediate the planes of the flange 13 and the partition 16 and close to the periphery 18 of the partition 16 but spaced therefrom sufficiently to maintain substantially the same area between the periphery 18 and the inner edge 24 of the lip 23 as between the periphery 18 and the wall 7.

Spaced from and coaxial with the wall 7 of the separator chamber and positioned above the plane of the baffle 21 is an annularly formed liquid collector device indicated generally at 25. This device includes, in the embodiment illustrated in Figures 1 to 8, an endless cylindrical panel or band 26 having an upper edge 27 and a lower edge 28. The band is preferably substantially coaxial with the shell 7 and is connected to the shell 7 by means of a substantially continuous transversely positioned annular flange or web 29. The web is secured to the shell in any desired manner as by welding and is likewise secured to the band at a point intermediate its upper and lower edges thus forming a pair of annular races or troughs adapted to collect liquid, an upper race 30 and a lower race 31, in the embodiment illustrated.

It will appear that the inner cylindrical surface of the shell 7 is in effect divided into three zones by the lip or flange 23 and the flange or web 29, these zones including a lower zone 32 between the head 8 and the flange 23, an intermediate zone 33 between the flange 23 and the flange 29, an upper zone 34 between the flange 29 and the head 10.

Adjacent the outlet opening 11 and interiorly of the separator is a sleeve 35 connected at its upper end to the head 10 and formed at its lower or inner end with an outwardly extending transverse flange 36, terminating in an upwardly extending lip 37 and forming a channel 38 adapted to receive liquid, surrounding the outlet opening.

A vertical or longitudinal duct 39 is provided for draining the separated liquids extracted from the gases. This duct is positioned, in the embodiment disclosed, immediately outwardly of the cylindrical plane of the shell and entrance to the duct is provided thru a slot 40 formed in the wall of the shell. The duct is formed by a deflected extension of the shell 7 at one edge of the slot as shown at 41, this 41 being extended to a point beyond the other edge of the slot indicated at 42 and is then bent toward the shell and connected with the shell whereby a portion 43 of the duct is formed outwardly of or behind the edge 42. This shell portion 42 forms, in effect, a lip interposed between the duct portion 43 and the interior of the separator which serves to shield the liquid in the duct 43 from the interior of the separator. As will appear from Fig. 6, an entrance 44 to the duct 39 is provided from the races 30 and 31 at the points where these races intersect the slot 40. It will likewise be evident that an entrance to the duct 39 is provided at 45 (Fig. 5) whereby an outlet is provided for the area immediately adjacent the flange 23. A drain for the channel 38 is also provided in the closed tubular duct 46 leading from the channel 38 to the upper race 30.

At the periphery of the outlet head 10 an upwardly projecting flange 47 is provided. This flange is interrupted at a point 48 to provide a drain opening for the area above the head 10, the liquid so drained being allowed to flow downwardly on the exterior wall of the separator adjacent the portion 43 of the duct 39. It is also to be noted that connection between the duct 39 and the area above the head 10 is blocked off at 49.

The discharge from the duct 39 and from the drain opening 48 is received in a well 50, this well being provided with a sealing partition 51 projecting below the upper edges of the side walls of the well, the liquid collected in the well flowing over the upper edge 52 of one of the walls 53 of the well and discharging thru into a receiver 54 from which it is drained thru a pipe 55, leading into the bath being evaporated.

Operation

The operation of the separator just described is as follows:

Advanced by a pressure differential between the chamber in the evaporator 1 and the evaporator outlet 3, the liquid laden vapors or gases enter the chamber of the separator thru the inlet opening 9 and pass upwardly thru the sleeve 12 rising within the chamber at the inlet and which imparts a substantially axial direction of motion to the gases. The upwardly travelling gases are blocked in part by the partition plate 16 which overlaps the inlet opening 9; and that portion of the upwardly travelling gases which is not blocked by the partition plate but which passes thru the aperture 17 is blocked by the baffle 21. The two separately blocked portions of the gases are thus separated from or peeled from the upwardly travelling gas stream and are forced radially outwardly in a transverse direction respectively between the partition 16 and the upper face of the flange 13 and between the partition 16 and the lower face of the baffle 21. The liquid laden gases may accordingly be said to be divided into adjacent parallel outwardly travelling zones. This transverse outward travel of the gases will be substantially uniform in all radial directions due to the co-axial arrangement of the opening 9, sleeve 12, partition 16, aperture 17 and baffle 21.

The two zones of transversely outwardly traveling gases pass respectively between the multiple spaced vanes 15 and 20 of the two adjacent tuyères 14 and 19. These vanes radiating from the axis and being inclined to the radial direction, impart a whirling or centrifugal motion to the gases as they pass thru the tuyères and the tuyères may accordingly be designated as a means for promoting or producing a whirling motion in the gases.

It is also to be noted that the whirling gases are advanced longitudinally from inlet to outlet by the difference in pressure between the inlet and outlet of the separator and as a result, the entire volume of gases in the separator between the tuyère and the evaporator outlet whirls at a high rate of speed and this whirling of the gases continues for a considerable distance beyond the outlet opening of the separator.

The liquids being heavier than the gases are more pronouncedly affected by the centrifugal force incident to the whirling motion of the gases and are accordingly expelled from the bodies of the two zones of the gases and are deposited upon the inner surface of the cylindrical wall or on the surface of the devices associated with the wall of the separator chamber.

As will be understood, the deposited liquid accumulating on the inner surfaces of the separator travel on the surface of the separator in response to the force of gravity and also in response to the action induced by the gases passing over the deposited liquid. These gases travelling rapidly in a peripheral and in a longitudinal direction from inlet to outlet of the separator, cause the liquid deposited on the inner surfaces of the separator to creep longitudinally and peripherally along the inner surfaces of the separator parts. The rapidly whirling gases carry the deposited liquid around the inner periphery of the shell until the liquid reaches the vertical slot 40 whereupon the liquid travels on the inner face of the deflected shell portion 41 into the duct 39 and by its momentum is carried into the portion 43 of the duct which is shielded from the interior of the separator by means of the lip 42. This lip 42 accordingly prevents any re-entraining or re-intermingling of the liquid in the duct with the clarified gases.

It will be evident that the tendency of the advancing whirling gases is counteracted to some extent by the force of gravity, the extent depending largely upon the velocity of the upwardly moving gases. In order to prevent or block the continuous upward and/or downward travel of the deposited liquid on the inner surface of the separator, the flange construction 23 and the web 29 and race construction associated with the liquid collector device 25 are provided for the purpose of segregating the deposited liquids and limiting their longitudinal travel.

It will be evident that the gases passing thru the lower tuyère 14 are most heavily laden with entrained liquid, and this liquid will be discharged against the zone 32 of the separator wall located below the flange 23. It will also be clear that it is undesirable for this relatively heavy deposit of liquid to be permitted to travel upwardly along the separator shell into the path of the less heavily laden gases where this liquid might be re-absorbed, and this eventuality is prevented by the flange 23. The tendency of the liquid to rotate and pass upwardly with the gas stream causes the liquid to bank against the under side of the flange 23 and discharge thru that portion 45 of the slot 40 adjacent the flange 23, as the banked liquid is peripherally advanced around the shell under the whirling influence of the gases. It will be evident that the deposited liquid passing thru the slot 40 will enter the duct 39 and will be advanced by its momentum into the portion 43 of the duct 39.

It will appear that the upper portion of the lower zone of the liquid laden gas passes above the flange 23, passing thru the opening formed by the periphery 24 of the flange 23 and periphery 18 of the partition plate 16 where it mingles with the upper transversely moving zone of gas and where it centrifugally deposits its entrained liquid upon the zones 33 and 34 of the separator shell. The annular liquid collecting device 25, and particularly its web 29, is provided to prevent any transfer of deposited liquid between the zones 33 and 34. As will be evident, any liquid travelling upwardly in the zone 33 along the inner surface of the separator will be blocked by the flange or web 29 and any liquid travelling downwardly in the zone 34 will likewise be blocked by the web 29. Any such liquid advancing toward the web 29 will be caught either in the race 30 or 31 from which it will be carried under the influence of the whirling gases into the slot 40 at the point 44 adjacent the races 30 and 31. It will also be clear that, once the deposited liquid has advanced into the race 30 or 31, it is automatically shielded from direct contact with the whirling gas inside the separator and is thus in no danger of becoming re-entrained in the gases.

The peripheral channel 38 formed around the sleeve 35 serves to catch any liquid which may be deposited by eddy currents on the outer side of the sleeve 35. This deposited liquid may be carried by means of the closed duct 46 to the upper race 30 and may be thence discharged to the duct 39 with the other liquid in the race 30.

After the gases have thus deposited the entrained liquid against the several liquid collecting surfaces, the clarified gases pass outwardly thru the outlet opening 11 whence they pass over the top of the separator thru the evaporator outlet 3.

The liquid collected by the duct 39 is deposited in the inner portion of the well 50 as clearly appears in Fig. 1.

It has also been found that liquid is deposited on the inner surface of the separator adjacent the outlet, as for instance on the wall 35 and flange 36. This liquid under the influence of the rapidly travelling gases tends to creep along these surfaces in the direction of the travelling gases until it reaches the upper surface of the head 10. Additional liquid is deposited on the head 10 under some circumstances after the gases leave the outlet opening 11 due to a pressure drop in the gases as they pass out of the separator. The flange 47 is provided around the outer periphery of the head in order to peripherally confine such liquid and direct it to the drain opening 48 whence it passes downwardly along the outer wall of the separator shell adjacent the duct 43 into the well 50.

Any liquid collecting upon the inner surface of the separator head 8 at the lower or inlet end, is discharged directly into the receiver 54 thru an opening 56 formed in the head 8.

The direction of travel of the gases in their passage thru the separator will be understood by reference to the arrows in Fig. 1.

It will be evident that it is necessary for the pressure on the discharge side of the separator to be lower than the pressure within the separator, in order that the flow of gas thru the separator may be assured. For this reason a seal is provided to prevent any unclarified gas from passing outwardly thru the discharge end of the duct 39 and thus contaminating the clarified gas passing out thru the evaporator outlet. The sealing partition 51 is provided to prevent this short circuit, the height of the liquid in the outer portion of the well being sufficient to counterbalance the pressure differential and to prevent the egress of any gas outwardly from the separator.

*First modified form*

A modified form of this separator is illustrated in Figures 9 to 13 inclusive, this embodiment, as in that previously described, also being mounted with its axis in a vertical position and being positioned adjacent the upper end of an evaporator and being adapted to clarify gases passing thru the separator in an upwardly direction.

In this modified separator, 60 indicates an evaporator shell, only a portion of the upper wall of which is shown, this shell being formed with an outlet opening 61. Adjustably supported from the evaporator shell 60 by means of a plurality of suspension rods 62 is a separator indicated in its entirety at 63 and consisting of a chamber 64 defined and enclosed by cylindrical, conical and flat shell portions. The separator shell portions include a central cylindrical portion 65, a lower cylindrical portion 66 and an upper relatively narrow cylindrical portion 67, a lower intermediate transverse plate portion 68 connecting the cylindrical portion 65 and 66, and a relatively narrow upper annular transverse flat plate portion 69 connecting the cylindrical portions 65 and 67. The separator is further provided with a head 70 at the lower or inlet end formed with an inlet opening 71. The separator is further provided with an upwardly converging conical head wall portion 72 extending upwardly from the cylindrical portion 67 and formed at its upper end with an outlet opening 73 registering with the outlet opening 61 in the separator.

In order to prevent the evaporating vapor and intermingled liquid from entering the separator directly, a baffle 74 is provided immediately below but spaced from the head 70, the outside diameter of this baffle overlapping the periphery of the inlet opening 71. The baffle is suitably supported in spaced relation from the head 70 by means of struts or brackets 75 welded to the head and baffle.

Supported on the inner face of the inlet head 70 is a whirl promoting tuyère of the cylindrical or barrel type indicated generally at 76, this tuyère being the lowermost of three tuyères embodied in the separator, as is best seen in Figure 9. This tuyère is of the multivane type and consists of a plurality of vanes parallel to the axis of the separator and peripherally spaced from each other and inclined to a radial plane passing thru the axis, these vanes being indicated at 77.

Mounted upon the upper end of the tuyère 76 is an annular partition plate 78, this partition being the lower of two partitions shown in this embodiment and being formed with an aperture 79 and outer periphery 80.

Mounted upon this lower partition 78 is an intermediate tuyère indicated generally at 81 of substantially the same diameter and construction as the tuyère 76, the vanes of the tuyère 81 being indicated at 82.

Supported upon the tuyère 81 is an annular upper partition plate 83 formed with an aperture 84 and an outer periphery 85.

Supported on the upper partition plate 83 is an upper tuyère 86 also of substantially the same diameter and construction as the tuyères 76 and 81, the vanes of the upper tuyère being indicated at 87.

Mounted upon the upper end of the upper tuyère 86 is an annular preferably impervious baffle plate 88 formed with an outer periphery 89. Mounted adjacent the outer periphery of the baffle 88 is a cylindrical shell 90 connected intermediate its upper and lower edges to the baffle 88. At its lower edge the cylindrical shell 90 is formed with an inwardly directed annular flange 91.

Mounted upon the lower head 70 and radially alined with, coaxial with and outwardly spaced from the periphery of the tuyère 76 is a cylindrical auxiliary shell 92. The lower edge of this shell is spaced from the head 70 at one or more points 93 to form drain openings.

The cylindrical wall portion 66 of the separator shell is continued upwardly above the transverse wall portion 68 forming an auxiliary cylindrical shell portion 94, radially alined with, coaxial with and spaced from the outer periphery of the tuyère 81. The shell 94 is formed with a drain opening 95 adjacent the head 70 and adjacent a certain liquid receiving well to be described.

Mounted upon the portion 65 of the cylindrical shell of the separator are a plurality of annularly formed liquid collector devices indicated at 96, 97 and 98, respectively. Each of these devices, as is best shown in Fig. 11 is made up of one or more curved bands mounted on a transversely positioned annular flange or web which is, in turn, connected to the shell 65. The bands are spaced from and coaxial with the shell and are indicated at 100, 101 and 102 and the transversely positioned webs are indicated at 103, 104 and 105, respectively. As will appear, annular upwardly opening channels are formed by the said bands, webs and the adjacent wall portions as indicated at 106, 107 and 108, respectively.

The liquid collector devices 96, 97 and 98 are not peripherally continuous but are each interrupted at one or more points, two such interruptions being embodied in each collector device shown, these interruptions being indicated at 109, 110 and 111, respectively, where adjacent ends of both the annular bands and the transversely positioned webs are spaced apart. The interruptions are laterally staggered in vertically adjacent collector devices, as most clearly appears in Fig. 9.

As will appear from Figures 9 and 11, the cylindrical wall portion 65 of the shell is continued upwardly above the transverse wall 69 forming an annular shell portion 112 spaced from and alined with and coaxial with the shell portion 67, and forming an upwardly annular opening channel 113 with the wall portion 69 and shell portion 67.

Adjacent the outlet opening 73 and interiorly of the separator is a cylindrical sleeve 114 connected at its upper end to the head 72 and formed at its lower or inner end with an outwardly extending transverse flange 115 provided with an upstanding lip 116 at its outer periphery and forming an annular channel 117, adapted to receive deposited liquid, as best appears in Fig. 9. A preferably closed tubular drain duct 118 extends from the channel 117 substantially to the shell 65 at a point immediately above the interruption 111.

As will appear from Fig. 9, a shallow pan is formed by the baffle plate 68 and shell 90 and drainage is provided for this area by the closed tubular duct 119 leading from the shell 90 to the shell 65 at the interruption point adjacent the shell 65 at the interruption 111. For the purpose of draining any deposited liquid which accumulates on the flange 91, a closed duct 120 is provided leading from the shell 90 adjacent the flange 91 to a point adjacent the shell 65 at the interruption 111.

A vertical closed duct 121 is provided for draining liquid deposited in the channel 113, this duct being positioned exteriorly of the shell 65.

A reservoir 122 is provided for the purpose of receiving the liquid which is collected in or by the several portions of this separator. The upper edge of this reservoir is level with the horizontal plate portion 68 and hence drains any liquid collecting on the upper surface of the plate 68. The drain opening 95 also communicates with one side wall of the reservoir and thus drains any liquid deposited on the plate portion 70. A sealing well 123 is also provided within the reservoir 122 in which the lower end of the duct 121 is immersed, the liquid in the sealing well 123 overflowing into the reservoir. The liquid collected in the reservoir is drained thru a tube 124 whose lower end is immersed in a seal 125, the liquid from which is intended, in this embodiment to overflow into the bath of liquid in the evaporator.

It will also appear that, in the modified form just described, the plurality of tuyères 76, 81 and 86 and baffles 78 and 83 and the apertures 79 and 84 are axially alined. It will also be noted that the areas of the apertures 71, 79 and 84 are progressively smaller, in order, from the inlet opening in a direction toward the outlet opening of the separator. It will also be clear that the areas of the successive annular spaces formed between the outer peripheries of the partition or baffle plates and the adjacent portions of the separator wall, and forming successive passages for the gases issuing from the peripheries of the successive tuyères, are also progressively larger, in a direction from the inlet opening to the outlet opening.

Operation of first modified form

The operation of the modified form of separator just described is similar, in principle to the operation of the previously described separator, differing, however in certain respects consequent to the modifications of construction.

As in the previous form, the liquid laden vapors or gases enter the chamber of the separator thru the inlet opening 71, this opening being protected from a direct inrush or surge of entrained liquid by the protecting baffle 74. The gases travelling upwardly from the opening 71 are blocked in part by the partition plate 78, these blocked gases, thus separated from or peeled from the gas stream, passing radially outwardly thru the tuyère 76. The gases passing thru the aperture 79 of the partition plate 78 are in turn blocked in part by the partition 83 this second body of blocked gases, thus separated or peeled from the remaining gas stream, passing radially outwardly thru the tuyère 81. The gases passing thru the aperture 84 are blocked by the impervious baffle 88 and caused to pass radially outwardly thru the tuyère 86. The liquid laden gases may accordingly be said to be divided into three adjacent parallel outwardly travelling zones of gases.

The tuyères 76, 81 and 86 comprised of vanes angularly inclined to the radius, impart a whirling or centrifugal motion to each of the zones of gases as they pass thru the tuyères. The liquids being heavier than the gases are centrifugally expelled from the several zones of the gases and are deposited upon the portions of the separator walls radially alined with the outer peripheries of the tuyères. Accordingly, the major portion of the gases discharged from the tuyère 76 deposit their entrained liquid upon the inner surface of the cylindrical shell 92. The gases issuing from the smaller upper portion of the tuyère 76 and the major portion of the gases issuing from the tuyère 81 deposit their entrained liquid against the cylinder walls 66 and 94. The gases issuing from the upper part of the tuyère 81 and from the tuyère 86 deposit their entrained liquid against the collector devices 96 and 97 and against the lower portion of the band 90 and upon the flange 91.

As previously explained, the liquid deposited on the inner surfaces of the separator creeps along the surface not only in response to the force of gravity but also in response to the action of the whirling gases passing over the deposited liquid.

The liquid deposited upon the shell 92 accordingly creeps downwardly and peripherally until it reaches the plate 70 whence the peripherally creeping liquid escapes radially outwardly thru the openings 93 and thence into the receiver 122. The liquid deposited on the surfaces of the shells 66 and 94 likewise advances peripherally and downwardly until it reaches the plate 70 whence it escapes thru the opening 95 into the receiver 122. It should be noted that the gases flowing outwardly thru the two lower tuyères are usually most heavily laden with liquid and this liquid is deposited principally on separate surfaces and is separately removed, there being no danger of reabsorption of the liquid deposited from either tuyère, by the gases issuing from the other tuyère. The liquid deposited against the collector devices 96 and 97 advances peripherally around the bands of these devices until it reaches the interruptions in the collector devices at which point the liquid travels outwardly against the shell 65 and runs downwardly along the inner face of the shell thru the interruptions 110 and 109 until it reaches the plate 68, from which it drains into the receiver 122. Some of the liquid deposited on the bands of the collector devices drips from the bottom edge of the bands before it reaches the interruptions and this liquid drops radially outwardly under the influence of the centrifugal force exercised by the whirling gases, toward the shell 65, the liquid from the band of the collector device 97 being caught in the upper channel of the collector device 96 and the liquid from the collector device 96 running or dropping to the plate 68 where it is shielded from any danger of reentraining in the clarified gases and whence it drains into the reservoir 122. The collector device 98 even tho above the plane of the tuyère 86 is still in the path of the whirling gases and receives a deposit of liquid which is advanced along the periphery of the band to the interruption 111 or drips from the bottom of the band into the channel in the next adjacent lower collector device 97. As will be understood liquid collecting in the channel of any collecting device travels peripherally along the channel until it reaches the interruption in the channel where the liquid drops into the next lower channel or runs down along the inner surface of the shell 65 to the bottom 68 whence it drains into the reservoir 122.

The liquid deposited on the band 90 and flange 91 creeps peripherally along the band and flange until it reaches the duct 120 thru which it runs to the shell 65 where it drops into the channel 107 and thence it travels downwardly along the shell thru the interruptions 110 and 109 and into the reservoir 122. The liquid collecting on the pan formed by the baffle 88 and the band 90 is conducted by the duct 119 to the interruption 111 and the liquid collecting in the channel 117 is conducted by the duct 118 to the interruption 111 whence the liquid drains to the reservoir 122 as described above.

As is indicated by the arrows in Fig. 9, the clarified gases pass upwardly thru the opening 73.

Second modified form

A second modified form of this improved separator is illustrated in Figures 14 to 19 inclusive. As in the first described embodiment of this invention, the separator to be presently described is shown mounted in the dome of an evaporator or boiler, with its axis in a vertical position and adapted to clarify gases passing thru the separator in an upwardly direction. In this embodiment, however, a portion of the dome structure is utilized to cooperate with the separator in performing its function.

Referring in detail to Figures 14 to 19, 127 indicates the evaporator. Integrally formed therewith is a dome 128 comprising a cylindrical shell 129 formed with a lateral outlet 130. The upper end of the dome 128 is closed by a dished head 131. The cylindrical shell 129 extends downwardly below the upper end of the evaporator 127, this shell 129 is provided at its lower end with a transverse head 132 formed with an inlet opening 133. Intermediate the upper and lower heads of the dome and at a point below the lateral outlet 130 is a transverse partition 134, this partition being formed with an opening 135. Extending upwardly from the periphery of the opening 135 is an inner shell 136, this shell preferably extending to a point above the top of the lateral outlet 130. This inner shell 136 is preferably coaxial with the shell 129 and spaced from the shell 129 and from the head 131 to provide an unrestricted passage for the clarified gases passing from the separator to the lateral outlet 130 over the top of the inner shell. The upper end of the inner shell 136 is closed by means of a substantially horizontal head 137 formed with a central outlet opening 138.

The structure just described may be said to divide the interior of the dome into three chambers, a primary separator chamber 139 formed between the lower head 132 and the partition 134, a secondary separator chamber 140 formed between the plane of the partition 134 and the head 137 interiorly of the inner shell 136, and an outlet chamber 141 above the partition 134 and exteriorly of the inner shell.

Extending upwardly from the periphery of the inlet opening 133 is a cylindrical sleeve 142 formed at its upper end with an outwardly extending horizontal flange 143. Supported on the upper face of the flange 143 is a whirl promoting tuyère of the cylindrical or barrel type indicated generally at 144, this tuyère being generally similar to those previously described and being formed of a plurality of peripherally spaced radially inclined vanes indicated at 145. Mounted upon the upper end of the tuyère 144 is an annular partition plate 146, this partition plate being the lower of two intermediate tuyère dividing partitions shown in this embodiment and being formed with an aperture 147 somewhat smaller than the diameter of the inlet opening 133 and the sleeve 142, and being formed with an outer periphery 148.

Mounted upon this lower partition 146 is a second whirl promoting tuyère indicated at 149, and comprised of vanes 150, this tuyère being substantially similar to the tuyère 144 but somewhat smaller in both internal and external diameter. Mounted upon the upper end of the second tuyère 149 is an upper intermediate tuyère dividing partition plate 151 formed with an aperture 152 somewhat smaller than the aperture 147 and formed with an outer periphery 153 somewhat smaller than the outer periphery 148. Mounted upon the upper face of the tuyère partition 151 is a third of upper whirl promoting tuyère 154 formed of vanes 155, this upper tuyère being generally similar in construction to the tuyères 149 and 144 but still smaller in internal and external diameter than the tuyère 149.

Mounted upon the upper end of the upper tuyère 154 is a circular baffle plate 156 having a relatively narrow vertical cylindrical band 157 welded to its outer periphery in such manner that portions of the band project respectively above and below the baffle. The outer periphery of the plate 156 overlaps and is accordingly substantially larger than the aperture 152 in the upper tuyère partition 151 and its outer periphery is also larger than the outer periphery of the adjacent upper tuyère 154.

Mounted upon the inner face of the inner shell 136 are a plurality of annularly formed liquid collector devices indicated at 158, 159 and 160, respectively. These devices are substantially similar in construction to the devices 96, 97 and 98 shown in Figures 9 to 13 inclusive, and each include one or more curved bands mounted on a transversely positioned annular flange or web, and need not be further described here in detail. As in the previously described forms, annular upwardly opening channels are formed by the bands, webs and adjacent wall portions as indicated at 161, 162 and 163. The liquid collector devices 158, 159 and 160 are not peripherally continuous but are each interrupted at least at one point as shown at 164, 165 and 166, respectively, these interruptions being laterally staggered in vertically adjacent collector devices, as appears in Fig. 14.

Adjacent the outlet opening 138 is a cylindrical structure 167 connected with the head and formed at its lower or inner end with a channel 168. A preferably closed tubular drain duct 169 leads from the channel 168 substantially to the inner shell 136 at a point within the interruption 166.

As will appear, a shallow pan is formed by the baffle 156 and the band 157 and drainage is provided for this area by the closed tubular duct 170 leading from the band 157 at a point above the baffle, substantially to the separator wall 136 at a point within the interruption 165. A preferably closed duct 171 also leads from the band 157 at a point below the baffle 156 to a point within the interruption 165.

A vertical duct 172 leads from the partition 134 downwardly into a sealing well 173 positioned within a liquid receiving well 174. The liquid receiving well 174 is positioned below the lower head 132 and the upper end of the well opens into the chamber 139 at its lower end, being flush with the head 132. The liquid receiving well is drained by means of a tube 175 whose lower end is immersed in a seal 176, the liquid from which is intended in this embodiment to overflow into the bath of liquid in the evaporator.

As in the first described form of this invention, a vertical drain duct 177 is formed immediately exteriorly adjacent the periphery of the shell 136. This duct is constructed similar to the previously described duct 39 and extends for the full height of the shell 136, and entrance to the duct is provided thru a slot formed in the shell. This duct is further formed as best appears in Fig. 19, with a portion extending behind a vertical lip formed on the shell as in the duct 39 whereby the liquid behind the lip is shielded from the interior of the separator. As will appear from Figures 14 and 19, the interruptions 164 and 166 are adjacent the duct 177 while the interruption 165 is slightly laterally spaced from the duct 177.

As will appear from an inspection of the drawings, the respective diameter of the three whirl promoting tuyères 144, 149 and 154 are progressively smaller in a direction from inlet to outlet of the separator thus forming a generally conical or pyramidal whirl promoting structure. It will further be clear that the liquid collector devices 158, 159 and 160 are disposed within the path of the whirling gases issuing from the tuyères and passing to the outlet of the separator.

Operation of second modified form

The operation of the second modified form of this separator just described is similar to the operation of the first modified form except in certain specific respects.

The liquid laden gases enter the inlet opening 133 and are laterally confined and directed into the pyramidal whirl promoting tuyère structure by the sleeve 142. The outer annular portion of the stream of gases travelling upwardly into the tuyère structure is blocked by the partition plate 146, and this blocked portion of the gases, thus separated from or peeled from the gas stream, passes radially outwardly thru the tuyère 144. The inner portion of the upwardly travelling stream of gases passes thru the aperture 147 and the outer annular portion of these inner gases is, in turn blocked by the partition plate 151, and this blocked portion of the gases, thus separated from or peeled from the remaining gas stream, passes radially outwardly thru the tuyère 149. The central or core portion of the upwardly travelling stream of gases passes thru the aperture 152, and, being blocked by the plate 156, passes radially outwardly thru the tuyère 154.

The liquid laden upwardly travelling gases are accordingly divided by the whirl promoting structure into three vertically superimposed zones of outwardly travelling gases.

The tuyères impart a whirling or centrifugal motion to the zones of gases passing thru the tuyères, and the liquids being heavier than the gases are centrifugally expelled from the zones of the gases and are deposited upon the portions of the separator walls radially in line with the outer peripheries of the several tuyères. Accordingly, the gases discharged from the tuyère 144 deposit their entrained liquid upon that portion of the cylindrical wall 129 below the transverse partition 134. The gases issuing from the peripheries of the tuyères 149 and 154 deposit their entrained liquid upon the wall 136 and upon the liquid collector devices 158, 159 and 160 mounted upon this wall. Some liquid will be deposited upon the under surface of the baffle 156 due to the sharp change in direction of the gases at the surface of this plate and this liquid will be caused to creep outwardly against the lower portion of the band 157.

The liquid deposited on the wall 129 below the portion 134 creeps peripherally and downwardly until it reaches the lower head 132 and drains into the liquid receiving well 174. The liquid deposited against the collector devices 158, 159 and 160 advances peripherally around the bands of these devices until it reaches the interruptions 164, 165 and 166, respectively, at which points the liquid travels outwardly against the wall 136 and then into the adjacent vertical duct 177. Some of the liquid deposited on the bands of the collector devices drips from the bottom edges of the bands before it reaches the interruptions and this liquid drops centrifugally outwardly toward the shell 136 under the influence of the whirling gases and is collected in the channels 161 or 162, respectively, in the case of the upper two collectors. Any liquid dripping from the lower collector is centrifugally carried against the inner surface of the shell 136. The liquid deposited on the surface of the shell 136 above or between the collector devices creeps into the channels of the collector devices and any liquid deposited on the shell 136 below the collector devices runs downwardly to the lower edge of the shell whence it creeps peripherally outwardly along the under surface of the partition 134 and runs down on the wall 129. The liquid in the channels 161, 162 and 163 runs peripherally along the channels under the influence of the whirling gases until it reaches the duct 177 which it enters and from which it runs downwardly thru an opening in the plate 134 into the chamber 139 and thence to the well 147.

Liquid deposited upon the under face of the baffle 156 and carried outwardly to the band is carried thru the duct 171 to the shell 136 at the interruption 165 where the liquid runs downwardly into the channel 161 and thence into the duct 177. The liquid collecting on top of the baffle 156 is similarly conveyed thru the duct 170. Liquid collected in the channel 168 is drained thru the duct 169 to the shell 136 at the interruption 166 where the liquid drains into the duct 177.

Any liquid which is deposited on the upper surface of the upper head 137 drains thru an opening provided in the periphery of the shell 136 above the duct 177 and runs downwardly on the outer face of the shell 136 and this liquid together with any other liquid deposited in the chamber 141 exteriorly of the separator shell 136 reaches the plate 134 from which it drains thru the sealed vertical duct 172.

As will appear, the surface of the wall 129 upon which the liquid from the tuyère 144 is deposited is far removed from the path of the travelling clarified gases and thus eliminates the danger of re-entraining of the liquid deposited on the wall 129.

Likewise any liquid which is collected in the channels 161, 162 and 163 is and remains shielded from the path of travel of the clarified gases, until the gases are discharged into the partly covered vertical drain duct 177 where it is likewise shielded against re-entraining or re-intermingling in the clarified gases.

The clarified gases pass out of the separator chamber thru the outlet opening 138 and then travel peripherally to the discharge opening 130. The path of travel of the gases in this form of separator is indicated by arrows in Figs. 14 to 19.

Third modified form

A third modified form of this invention is illustrated in Figures 20 to 23 inclusive, this modification showing this invention embodied in a line separator, that is in a separator adapted for inserting in a line or conduit conveying vapor which may have accumulated considerable liquid by condensation or otherwise subsequent to its discharge from the evaporator and which must be clarified before the vapor is introduced into the apparatus in which it is to be utilized or further processed. This third modification further illustrates the principle of this invention utilized for clarifying gases passing in a downwardly direction. It is to be further noted that this embodiment utilizes only a portion of the novel features of this invention disclosed in connection with the previously described embodiments.

Referring now to the drawings, Figures 20 to 23, a main casing is indicated at 178, this casing being formed with a central substantially enlarged cylindrical body portion 179 and at its upper end with a preferably flanged inlet opening 180 and at its lower end with a similar outlet opening 181, preferably axially alined with the inlet opening. Disposed interiorly and coaxially with the body portion 179 is an inner substantially cylindrical casing 182 formed with substantially cylindrical shell portion 183 spaced from the cylindrical body portion 179 and integrally connected with the lower end of the main casing 178 at 184. The upper end of the inner casing 182 is tapered conically inwardly and formed with an opening 185.

The structure just described may be said to form two chambers within the casing 178, a primary separating chamber 186 within the inner casing 182 and a jacket or secondary separating chamber 187 between the cylindrical body portion 179 of the main casing 178.

Removably mounted in the opening 185 and positioned within the inner casing is a preferably cylindrical sheet metal sleeve 188. This sleeve is formed at its upper end with an opening 189 and at its lower end with a transversely positioned impervious head 190. Intermediate its upper and lower ends the sleeve is formed with a substantially horizontal transverse partition 191, this partition being formed with substantially central aperture 192 having an area, in the embodiment illustrated, substantially equal to one half of the area of the opening 189. Between the partition 191 and the head 190 the wall of the sleeve 188 is formed with a series of inwardly pressed angularly deflected louvres 193. The wall of the sleeve 188 between the partition 191 and the opening 189 is likewise formed with a similar series of inwardly deflected angularly disposed louvres 194.

Mounted in the outlet opening 181 of the main casing 178 and passing thru and above the connecting portion 184 is a preferably cylindrical sheet metal sleeve 195 having its upper portion 196 projecting into the chamber 186 formed within the inner casing 182. The removably mounted sleeve 195 is of substantially the same diameter as the sleeve 188 and is preferably formed at its upper end with an inwardly directed flange 197 forming an opening 198 serving as an outlet opening for the clarified gases. Formed adjacent the periphery of the head 190 is an aperture provided with a short duct or spout 199 inclined in a downwardly and outwardly direction so that its discharge outlet is positioned radially exteriorly of the edge of the opening 198 as clearly appears in Fig. 20. At the bottom and adjacent the periphery of the inner casing 182 is an outlet provided with a duct 200 adapted to drain liquid collected in the chamber 186. At the lower end of the cylindrical body portion of the main casing 178 and at its periphery is an opening formed with a drain duct 201 for draining liquid from the outer chamber 187.

Operation of third modified form

The operation of the third modified form is as follows: The liquid laden gases entering the inlet opening 180 of the line separator 178 pass downwardly into the interior of the tuyère sleeve 188.

The outer peripheral portion of these gases is blocked by the partition 191 and this portion of the gases passes radially outwardly thru the louvres or vanes 194. The central portion of the downwardly travelling liquid laden gases passes thru the aperture 192 and is blocked by the impervious lower head 190, these gases accordingly, being forced to pass outwardly thru the louvres or vanes 193.

The downwardly travelling gases are thus divided into two superimposed zones of outwardly travelling gases. The louvres 193 and 194 being angularly inclined with reference to a radial plane passing thru the louvres, cause the gases travelling thru the tuyères to whirl in a rotary direction thus centrifugally expelling the liquid and depositing it against the inner face of the wall 183. These gases then travel downwardly along the periphery of the chamber 186 and change their direction sharply at the bottom of the chamber 186, rising and escaping thru the elevated outlet opening 198 in the outlet sleeve 195, all as will be clearly apparent from the arrows in Fig. 20. Liquid is deposited upon the upper surface of the head 190 as a result of the sharp change of direction of travel of the liquid laden gases and liquid is likewise discharged from the gases at the botttom of the chamber 186 because of the sharp change in direction of the gases at that point.

The liquid deposited upon the upper surface of the head 190 is drained thru the duct 199 and is deposited in the chamber 186 at a point exteriorly of the outlet opening 198 of the sleeve 195. The liquid deposited in the chamber 186 upon the inner surface of the wall 183 and on the lower portion of this wall and the liquid draining from the duct 199 is carried out of the chamber 186 by means of the drain duct 200. The liquid conveyed by the duct 200 together with any liquid which may be deposited in the chamber 187 is drained thru the outlet 201.

The clarified gases pass outwardly thru the sleeve 195 as clearly appears from an inspection of Fig. 20.

It will be evident that the herein described separator construction may be embodied in separators mounted in any angular position and that the positions which may be assumed by the separators is not necessarily limited to the positions shown and described.

Also this separator is not limited to abstracting liquid from gases or vapors. Solid or semi solid impurities, salts, crystals, or other subtsances may equally well be separated from the gases or vapors.

Many modifications may be made in the details or arrangement of parts, for instance more than three superimposed tuyères may be embodied in the whirl promoting tuyère structure and any number of liquid collecting devices may be provided on the inside surfaces of the walls of the separator. Likewise the shells need not necessarily be cylindrical as shown and described as they may be polygonal, elliptical or other convenient shape. Also the partition plates, baffles and tuyères need not necessarily be coaxial as shown, and certain elements of this multiple whirl promoting structure may be eccentric relatively to other elements depending on the angular position occupied by the separator and upon the results desired. Further, the longitudinal spacing of the partition or partitions with relation to the inlet opening and baffle need not necessarily follow the disclosures in the drawings, and numerous changes may be made in this respect without objectionably affecting the efficiency of this apparatus.

Many other modifications may be made in the construction of, and many equivalents may be substituted for, the parts shown which will come within the spirit and scope of this invention and many such modifications in addition to those shown or suggested in this application will naturally occur to those skilled in this art and the present disclosures should therefor be considered as typical only and applicant desires not to be limited to the exact construction shown and described.

What I claim is:

1. Apparatus for separating entrained liquids from gases including in combination, a chamber having a substantially cylindrical shell and an inlet opening at one end and an outlet opening at the other end, a transversely disposed partition positioned within the chamber and spaced from and overlapping the periphery of the inlet opening, said partition being formed with an aperture substantially coaxial with and of less area than the inlet opening, the outer periphery of the partition being spaced from the shell, a radial whirl promoting multiple vane tuyère interposed between the inlet opening and the partition, the partition extending substantially beyond the vanes of the tuyère, a baffle interposed in spaced relation between the partition and the outlet opening and overlapping the aperture in the partition, and a second whirl-promoting multiple vane tuyère interposed between the partition and the baffle.

2. Apparatus for separating entrained liquids from gases including in combination, a chamber having a substantially cylindrical shell and an inlet opening at one end and an outlet opening at the other end, a transversely disposed partition positioned within the chamber and spaced from and overlapping the periphery of the inlet opening, said partition being formed with an aperture substantially coaxial with and of less area than the inlet opening, the outer periphery of the partition being spaced from the shell, a whirl promoting multiple vane tuyère interposed between the inlet opening and the partition, the partition extending substantially beyond the vanes of the tuyère, a baffle interposed in spaced relation between the partition and the outlet opening and overlapping the aperture in the partition and a second whirl promoting tuyère interposed between the partition and the baffle.

3. Apparatus for separating entrained liquids from gases including in combination a chamber having a substantially cylindrical shell and an inlet opening at one end and an outlet opening at the other end, a transversely disposed partition positioned within the chamber and spaced from the inlet opening, said partition being formed with an aperture substantially coaxial with and of less area than the inlet opening, the outer periphery of the partition being spaced from the shell, a whirl promoting multiple vane tuyère interposed between the inlet opening and the partition, the partition extending substantially beyond the vanes of the tuyère, and a baffle interposed in spaced relation between the partition and the outlet opening and overlapping the aperture in the partition, and a second whirl promoting tuyère interposed between the partition and the baffle, the areas between the shell and the peripheries of the partition and the baffle respectively, being substantially directly proportional to the areas of the apertures in the partition and the inlet opening.

4. Apparatus for separating entrained liquids from gases including in combination, a chamber having a substantially cylindrical shell and an inlet opening at one end and an outlet opening at the other end, a transversely disposed baffle positioned interiorly of the chamber and disposed between and overlapping the inlet and outlet openings and having its periphery spaced from the shell, an annular transversely disposed plate interposed substantially midway between the inlet opening and the baffle and having its outer periphery spaced from the shell, and whirl producing tuyères interposed respectively between the inlet opening and the annular plate and between the annular plate and the baffle, the area of the aperture in the annular plate being substantially one half the area of the inlet opening and the transverse area between the periphery of the annular plate and the shell being substantially one half of the transverse area between the periphery of the baffle and the shell, the tuyère between the inlet and annular plate being spaced outwardly beyond the inlet.

5. Apparatus for separating entrained liquids from travelling gases including in combination, a chamber formed with a substantially cylindrical wall and having an inlet opening at one end and an outlet opening at the other end, means disposed within the chamber adjacent the inlet opening including a plurality of adjacent longitudinally alined multi-vaned tuyères for imparting whirling motion to successive zones of the travelling gases, a plurality of substantially continuous spaced inwardly projecting annular flanges mounted on the chamber wall dividing the inner surface of the wall into a plurality of zones longitudinally bounded by the flanges, each of the wall zones being positioned to receive liquid centrifugally separated from the whirling gases issuing from one of the tuyères and the flanges being adapted to substantially block the longitudinal creep of separated liquid from one zone to an adjacent zone, and duct means associated with each of said zones adapted to conduct separated liquid out of the chamber.

6. Apparatus for separating entrained liquids from travelling gases including in combination a substantially cylindrical chamber formed with a substantially cylindrical wall having an inlet opening at one end and an outlet opening at the other end, means within the chamber communicating with the inlet opening including a multi-vane tuyère for imparting a whirling motion to the travelling gases adapted to centrifugally deposit the entrained liquid on the cylindrical wall and tending to cause the deposited liquid to creep peripherally around and longitudinally along the wall, a plurality of annularly formed flanges mounted on the inner periphery of the chamber wall juxtaposed to the tuyère and dividing the inner surface of the wall into a plurality of zones defined by the flanges and disposed in the path of the whirling gases, said flanges being adapted to block the longitudinal creeping of the separated liquids while permitting their rotational creeping around the cylindrical wall, the cylindrical wall being formed with a longitudinal slot extending for the full length of the zones, a longitudinal duct formed adjacent the slot exteriorly of the cylindrical surface defined by the interior of the shell and communicating with the slot, a longitudinal lip overlapping the duct adjacent the slot shielding the duct from the interior of the chamber, the slot serving to separately withdraw from each of said wall zones the liquid creeping along the said chamber wall of said zone.

7. Apparatus for separating entrained liquids from gases including in combination, a chamber formed with a substantially cylindrical wall and having an inlet opening at one end and an outlet opening at the other end, a baffle transversely positioned interiorly of said chamber and substantially coaxial with the inlet opening and having its periphery spaced from the cylindrical wall, a transversely disposed partition positioned intermediate the inlet opening and the baffle formed with an aperture coaxial with but of smaller diameter than the inlet opening and having its outer periphery spaced from the cylindrical wall, whirl promoting tuyères interposed respectively between the inlet opening and the partition and between the partition and the baffle, each tuyère being formed of a plurality of radially inclined guiding vanes, an inwardly projecting annular flange mounted on the inner face of the cylindrical wall longitudinally positioned between the inlet opening and the partition and having an inside diameter greater than the outside diameter of the partition, a substantially cylindrical band spaced from and coaxial with the cylindrical wall and connected to the wall by an annular transverse web whereby an annular race is formed between the wall and the band, the band being longitudinally positioned between the baffle and the outlet opening, and liquid draining means associated with the said flange and race adapted to conduct liquid from the chamber.

8. Apparatus for separating entrained liquids from gases including a chamber having a substantially cylindrical shell and an inlet opening at one end and an outlet opening at the other end, and means for imparting a whirling motion to the gases passing from the inlet to the outlet openings, said means including a substantially blank transversely disposed baffle coaxial with the inlet opening and a plurality of transversely disposed centrally apertured baffles interposed between the inlet opening and the said blank baffle, the outer peripheries of the baffles being spaced from the adjacent portion of the shell, and a whirl producing tuyère formed of multiple vane elements interposed between each pair of baffles and between the opening and the adjacent apertured baffle, the respective external diameters of the successive tuyères being progressively smaller in order from the inlet opening.

9. Separating apparatus comprising a chamber having an inlet, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, and a closure overlying said second mentioned tuyère.

10. Separating apparatus comprising a chamber including a substantially cylindrical shell and an inlet, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, and a closure overlying said second mentioned tuyère.

11. Separating apparatus comprising a chamber including a substantially cylindrical shell having an inlet and drainage means extending substantially along an element of said cylindrical shell, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, and a closure overlying said second mentioned tuyère.

12. Separating apparatus comprising a chamber including a substantially cylindrical shell having an inlet, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, a closure overlying said second mentioned tuyère, the areas between the shell and the periphery of the baffle and of the closure respectively, being substantially directly proportional to the areas of the inlet and of the aperture in the baffle.

13. Separating apparatus comprising a chamber including a substantially cylindrical shell having an inlet, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, a closure overlying said second mentioned tuyère, peripherally extending flanges on the surface of the shell, the areas between the shell and the periphery of the baffle and of the closure respectively, being substantially directly proportional to the areas of the inlet and of the aperture in the baffle.

14. Separating apparatus comprising a chamber including a substantially cylindrical shell having an inlet, an apertured baffle with its aperture substantially axially in alignment with said inlet, a radial whirl promoting tuyère between the inlet and the baffle and spaced radially substantially from the periphery of the aperture, a second radial whirl promoting tuyère on the opposite side of said baffle, a closure overlying said second mentioned tuyère, peripherally extending channel-shaped flanges on the surface of the shell, the areas between the shell and the periphery of the baffle and of the closure respectively, being substantially directly proportional to the areas of the inlet and of the aperture in the baffle.

OTTO P. WARNER.